US008516900B2

(12) United States Patent  
Pihlaja et al.

(10) Patent No.: US 8,516,900 B2
(45) Date of Patent: Aug. 27, 2013

(54) MULTIPHASE FLOWMETER WITH BATCH SEPARATION

(75) Inventors: Roger K. Pihlaja, Spring Park, MN (US); Kelli K. Lais, Saint Paul, MN (US); Morgan B. Impola, Cokato, MN (US); Isaac Remer, Minneapolis, MN (US); Brian J. Sames, Shakopee, MN (US)

(73) Assignee: Rosemount Inc., Eden Prairie, MN (US)

( * ) Notice: Subject to any disclaimer, the term of this patent is extended or adjusted under 35 U.S.C. 154(b) by 192 days.

(21) Appl. No.: 13/102,256

(22) Filed: May 6, 2011

(65) Prior Publication Data

US 2011/0283809 A1 Nov. 24, 2011

Related U.S. Application Data

(60) Provisional application No. 61/333,996, filed on May 12, 2010.

(51) Int. Cl.
*G01F 1/74* (2006.01)
(52) U.S. Cl.
USPC ....................................................... 73/861.04
(58) Field of Classification Search
USPC .......................................... 73/861.04, 863.03
See application file for complete search history.

(56) References Cited

U.S. PATENT DOCUMENTS

| | | | |
|---|---|---|---|
| 3,530,711 A | 9/1970 | Tocanne | 73/155 |
| 4,312,234 A | 1/1982 | Rhodes et al. | 73/861.04 |
| 4,429,581 A | 2/1984 | Furmaga | 73/861.04 |

(Continued)

FOREIGN PATENT DOCUMENTS

| | | |
|---|---|---|
| DE | 102007013418 | 8/2008 |
| GB | 2319620 | 5/1998 |

OTHER PUBLICATIONS

Notification of Transmittal of the International Search Report and the Written Opinion for the corresponding International patent application No. PCT/US2011/035688 dated Sep. 22, 2011.
Rosemount 3051 SMV MultiVariable™ Mass Flow Transmitter. Product Overview. Emerson Process Management. 7 pages.

(Continued)

*Primary Examiner* — Jewel V Thompson
(74) *Attorney, Agent, or Firm* — Westman, Champlin & Kelly, P.A.

(57) ABSTRACT

A process fluid flow system is provided having an input, an output, and a plurality of fluid circuits disposed between the input and output. At least one valve is disposed to selectably cause process fluid to flow through either a first circuit of the plurality of circuits, or a second circuit of the plurality of circuits. Process fluid flows through the first circuit during normal production, and through the second circuit during process fluid sequestration. A process fluid flow measurement device is operably interposed between the input and output and configured to measure total flow through the system. A separator is disposed in the second circuit and is arranged to allow the process fluid to separate gravitationally over time into immiscible components of the process fluid, the separator having a known internal volume. A guided wave radar level measurement device is preferably disposed to measure heights of interfaces within the separator. A controller is coupled to at least one valve, the process fluid flow measurement system, and the guided wave radar level measurement device. The controller is configured to combine total process fluid flow information from the process fluid flow measurement device with measured height information from the guided wave level measurement device to provide fractional flow rates for at least one immiscible component of the process fluid.

13 Claims, 7 Drawing Sheets

(56) References Cited

U.S. PATENT DOCUMENTS

| | | | | |
|---|---|---|---|---|
| 4,627,267 | A | 12/1986 | Cohrs et al. | 73/3 |
| 4,852,395 | A * | 8/1989 | Kolpak | 73/61.44 |
| 5,259,250 | A | 11/1993 | Kolpak | 73/861.38 |
| 6,032,539 | A * | 3/2000 | Liu et al. | 73/861.04 |
| 6,401,529 | B1 | 6/2002 | Robison et al. | 73/152.19 |
| 6,823,271 | B1 | 11/2004 | Foss | 702/50 |
| 7,024,951 | B2 | 4/2006 | Germond | 73/863.21 |
| 7,942,065 | B2 * | 5/2011 | Xie | 73/861.04 |

OTHER PUBLICATIONS

Rosemount Process Level Guided Wave Radar and Vibrating Fork Switches. Product Overview. Emerson Process Management. 4 pages.

Bristol® ControlWave® Micro. Product Overview. Jun. 26, 2007. Emerson Process Management. 2 pages.

Office Action from the corresponding Chinese patent application No. 201180001534.0 dated Dec. 18, 2012.

* cited by examiner

MULTIPHASE FLOWMETER WITH BATCH SEPARATION

CROSS-REFERENCE TO RELATED APPLICATION

The present application is based on and claims the benefit of U.S. provisional patent application Ser. No. 61/333,996, filed May 12, 2010, the content of which is hereby incorporated by reference in its entirety.

BACKGROUND

When an oil well is producing oil, it will sometimes produce undesirable components, such as water. For an oil well that is producing substantial oil, the investment in expensive and complex devices to continuously measure relative fractions of oil, gas, water and/or other materials, is certainly justified. One such device uses nuclear densitometry to provide a multiphase flowmeter than can continuously monitor relative amounts of oil, water, gas and/or other substances. However, a multiphase flowmeter based upon nuclear densitometry can cost as much as $100,000 per installation. While this cost is high, it is easily justified by an oil well with significant producing volume.

Oil wells, toward the end of their usable lifetime, begin to produce significant amounts of three-phase oil/water/gas mixture. Moreover, since these wells have a diminished production capacity, the significant capital expenditures to manage the oil well is not always feasible. For example, the continued use of a multiphase flowmeter employing nuclear densitometry will often not be justified. However, simply abandoning the declining oil well in view of the higher operating costs is also disfavored since it would leave behind the remaining portion of oil in the well.

It would be beneficial in the art of oil recovery if a new multiphase flowmeter solution could be provided for oil wells that do not produce oil in sufficient volume to justify a multiphase flowmeter based upon nuclear densitometry. Providing such a multiphase flowmeter could extend the usable lifetime of an oil well without the associated high operating costs of a high production well.

SUMMARY

A process fluid flow system is provided having an input, an output, and a plurality of fluid circuits disposed between the input and output. At least one valve is disposed to selectably cause process fluid to flow through either a first circuit of the plurality of circuits, or a second circuit of the plurality of circuits. Process fluid flows through the first circuit during normal production, and through the second circuit during process fluid sequestration. A process fluid flow measurement device is operably interposed between the input and output and configured to measure total flow through the system. A separator is disposed in the second circuit and is arranged to allow the process fluid to separate gravitationally over time into immiscible components of the process fluid, the separator having a known internal volume. A guided wave radar level measurement device is preferably disposed to measure heights of interfaces within the separator. A controller is coupled to at least one valve, the process fluid flow measurement system, and the guided wave radar level measurement device. The controller is configured to combine total process fluid flow information from the process fluid flow measurement device with measured height information from the guided wave level measurement device to provide fractional flow rates for at least one immiscible component of the process fluid.

DETAILED DESCRIPTION OF ILLUSTRATIVE EMBODIMENTS

Embodiments of the present invention generally stem from the idea of sequestering a small portion of actual oil well flow from the production flow, and allowing the sequestered sample volume to settle to some extent such that measurements and/or inferences regarding the relative proportions oil, gas, and/or water can be provided. While such techniques do not offer the up to the second, real-time, output of multiphase flowmeter that uses nuclear densitometry, they do provide a viable solution with significantly lesser expense. In one embodiment, a device was provided that could accurately determine the amount of gas, oil, and water with less than +/−10% overall error, and was able to work in conditions with over eighty percent water cut. Moreover, the multiphase flowmeter was able to perform in areas with temperatures around 200° F. with pressures up to 15,000 psi. Additionally, the design required minimum human contact, and manufacturing cost, and it was able to be provided for approximately ⅕ the cost of a multiphase flowmeter using traditional nuclear densitometry technologies.

In one particular embodiment, a device captures a sample of the mixture from the overall flow and allows the sample to naturally settle. While this technique is not the quickest solution, it is accurate and reliable. Accuracy and reliability are more important than the frequency of measurement for this particular problem.

Figure 1:
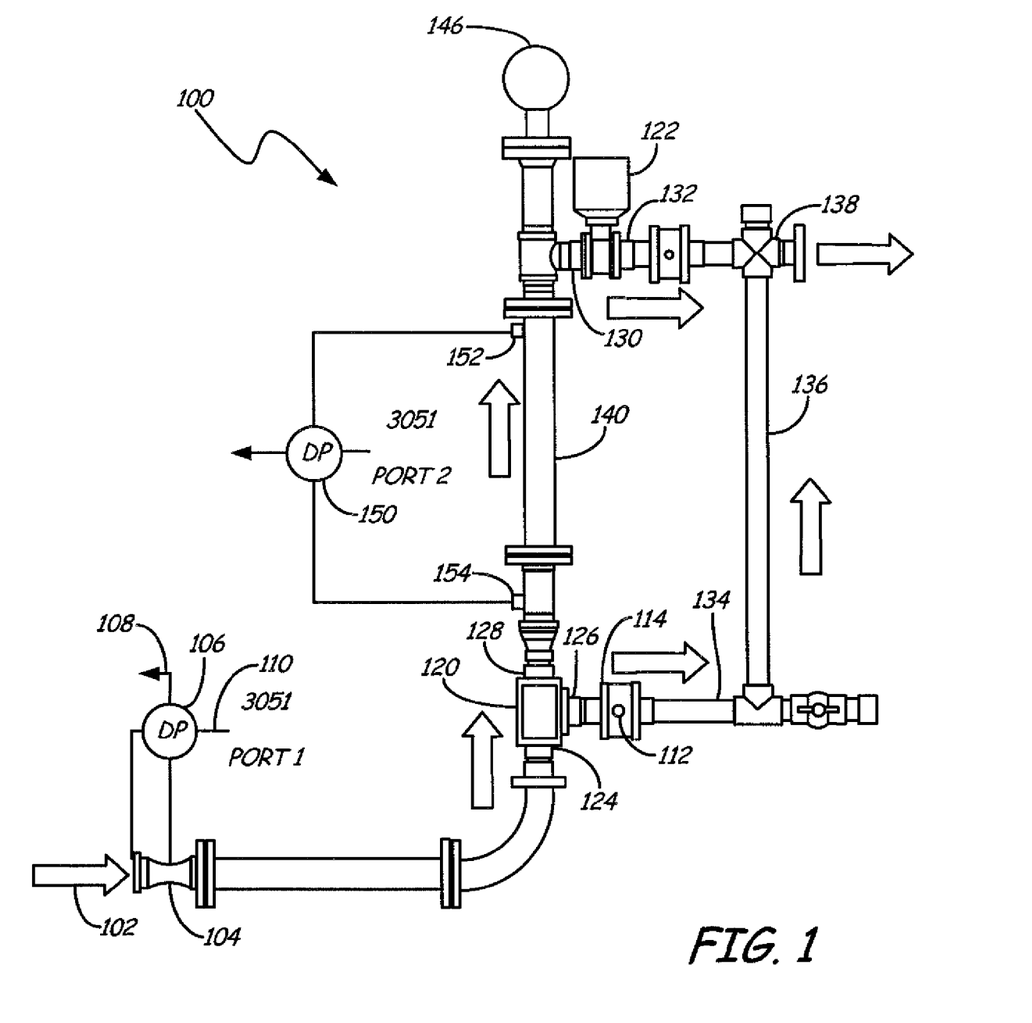
FIG. 1 is a diagrammatic view of a multiphase flowmeter using batch separation in accordance with an embodiment of the present invention.

FIG. 1 is a diagrammatic view of a multiphase flowmeter using batch separation in accordance with an embodiment of the present invention. System 100 includes an inlet 102 where multiphase fluid flows into a venturi 104. A pair of impulse pipes, or pressure taps convey the pressure at two locations along the venturi to a differential pressure transmitter, such as that sold under the trade designation 3051SMV available from Emerson Process Management of Chanhassen, Minn., illustrated at reference numeral 106. Differential pressure transmitter 106 calculates a value of the differential pressure and that value is related to fluid flow based upon the venturi geometry. The flow value is conveyed to an external device via a process loop connection 108. Differential pressure transmitter 106 is also coupled to a temperature sensor via port 110, which port 110 is electrically coupled to a temperature sensor 112 disposed to measure process fluid temperature at location 114. Knowledge of fluid flow and the temperature of the process fluid allow differential pressure transmitter 106 to provide a mass flow rate of the overall process fluid.

System 100 includes a pair of ball valves 120, 122 which cooperate to selectively convey process fluid through one of two possible paths. Preferably, ball valve 120 is a commercially available three-way ball valve that can selectively convey process fluid from inlet 124 through either outlet 126 or outlet 128. Ball valve 122 is preferably a two-way ball valve that simply interrupts or allows flow between inlet 130 and outlet 132. During normal operation, ball valve 120 is commanded to convey process fluid from inlet 124 to outlet 126 thus process fluid passes through pipes 134, 136, and through outlet 138. Upon suitable actuation, valves 120 and 122 cooperate to divert flow through sample column 140 instead of through circuit including pipes 134 and 136. Once enough flow through column 140 has occurred, valves 120 and 122 are again commanded to revert the flow through the normal flow path. When this occurs, a certain amount of process fluid that was flowing through column 140 is simply held therein. Preferably, the operation of valves 120, 122 was based off of a timer controlled by a suitable electronic device, such as a programmable logic controller. However, any suitable event for input signal can be sued to operate valves 120, 122 in order to obtain samples at any suitable period or in response to any suitable process information.

With no flow, the effect of gravity will gradually cause the different process fluid elements to separate according to their specific gravities. For example, when gas, oil and water are all present in the fluid flow, the gas will naturally settle on the top, oil will settle in the middle, and water will settle on the bottom. This settling behavior of the various fluids is advantageous in that the fluids conveniently settle with the value of the dielectric constants of each phase occurring from smallest to largest as one travels from top to bottom within column 140. This provides a convenient application for a guided wave radar level device, such as that sold under the trade designation, Model 5300 Series Guided Wave Radar level transmitter available from Emerson Process Management. Preferably, a guided wave radar level transmitter is disposed above column 140 and configured to direct guided wave radar into column 140. Moreover, the size of column 140 is selected based upon specifications of the radar level transmitter 144. Radar level transmitters illustrated at reference numeral 144 and can be any suitable guided wave radar level device including that listed above. Other level measurement devices may be used provided they can detect the interfaces of the various fluids. Transmitter 144 has a process communication loop output 146 that is coupled to a suitable device, such as a programmable logic controller, or computing device, to provide information about the height of process fluid interfaces (a border between two separated fluids, such as oil and water) within column 140. Using a priori information relative to the internal volume of column 140, the relative height information of the process fluid interfaces can be measured and/or extrapolated to compute relative fractional volumes of the various components of the process fluid. The guided wave radar level transmitter employs low power nano-second microwave pulses that are guided down a probe (not shown) submerged in process media. When a microwave pulse reaches a media with a different dielectric constant, part of the energy is reflected back to the transmitter. The transmitter uses the residual wave of the first reflection for measuring interface level. Part of the wave, which of was not reflected at the upper product surface, continues until it is reflected at the lower product surface. The speed of this wave depends fully on the dielectric constant of the upper product. The time difference between the transmitted and reflected pulse is converted into a distance, and the total level or interface level is then calculated. The reflection intensity depends on the dielectric constant of the product; the higher the dielectric constant value, the stronger the reflection.

Guided wave radar level technology provides highly accurate and reliable direct level measurement with no compensation needed for changing process conditions, such as density, conductivity, viscosity, pH, temperature, pressure, color of the fluid, impurities in the mixture, et cetera. Another advantage of employing guided wave radar level techniques over traditional techniques such as nuclear densitometry is that such techniques do not rely on any radioactive material or require the use of any induced separation techniques that make the device susceptible to greater error as a result of only partial phase separation.

As illustrated in FIG. 1, system 100 also preferably employs a second differential pressure transmitter 150 to sense differential pressure between ports 152, 154. The sensed differential pressure provides an indication of hydrodynamic pressure within column 140, and thus an indication of the level of process fluid within column 140. This differential pressure measurement provides an overall bulk density measurement of the fluid trapped within column 140. In essence, by measuring the static head over a known length of the fluid within a known volume of column 140 provides an indication relative to bulk fluid density.

Figure 2:
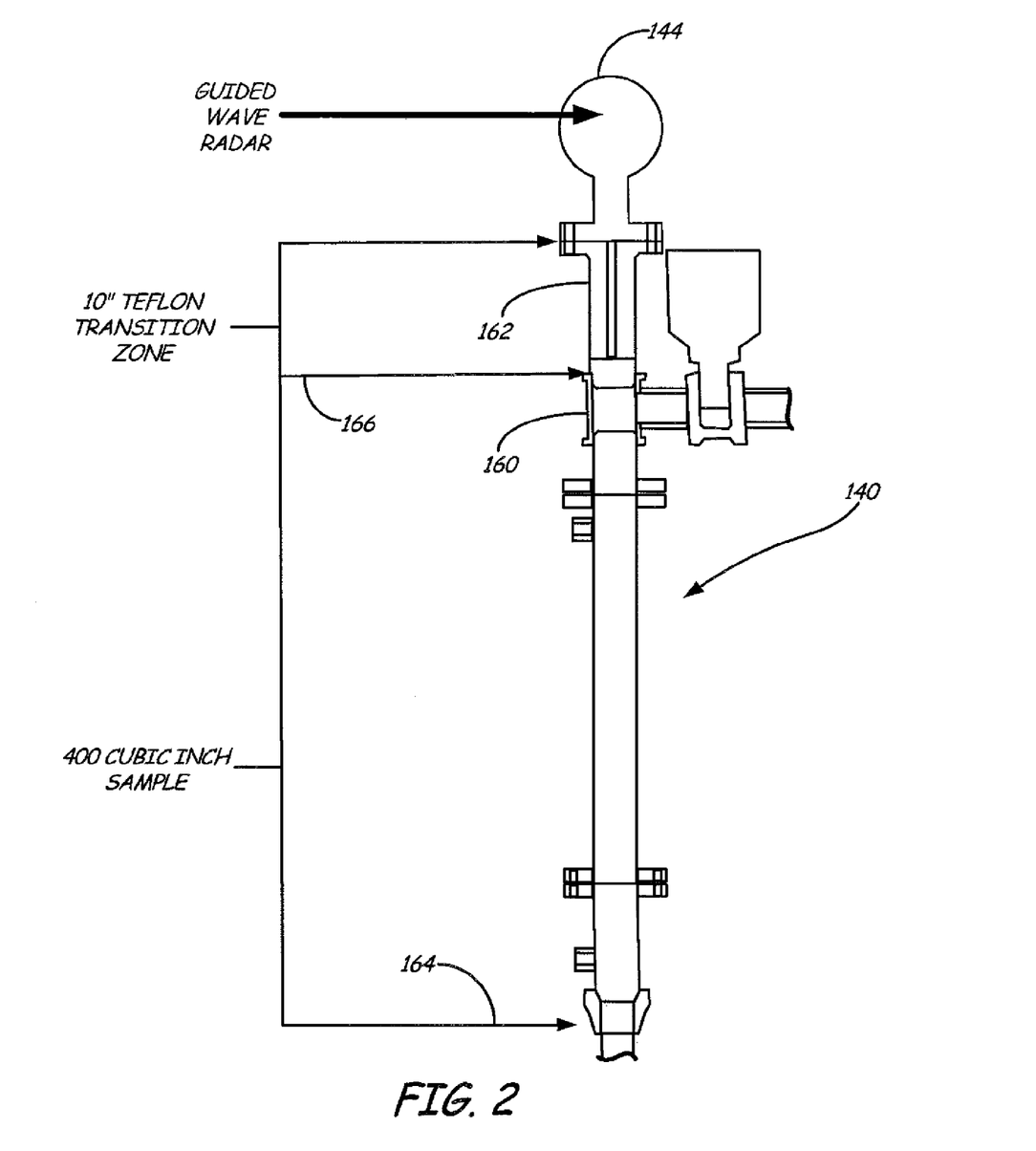
FIG. 2 is a diagrammatic view of a column with a guided wave radar level transmitter mounted at a top end thereof in accordance with an embodiment of the present invention.

FIG. 2 is a diagrammatic view of column 140 with guided wave radar level transmitter 144 mounted at a top end thereof. Preferably, column 140 is coupled to a T-fitting 160 that is coupled to a transition zone 162 of sufficient distance to allow the guided wave radar level transmitter enough time to send out a minimum signal to calibrate itself before it receives a signal it can register. In accordance with one embodiment of the present invention, the transition zone is 10 inch long transition zone constructed of polytetrafluoroethylene. As further illustrated in FIG. 2, the volume from bottom portion 164 to the top, 166, of T 160 is approximately 400 cubic inches. Once the process fluid sample is conveyed into column 140, it will naturally settle over time and the guided wave radar level transmitter 144 will determine the location of the interfaces needed for determining the composition of the sample. Since the internal diameter of the cylinder is known; the respective heights of the separated material are measured; and the overall height of the sample chamber is known, the calculation of volumetric concentration be provided relatively easily.

Figure 3:
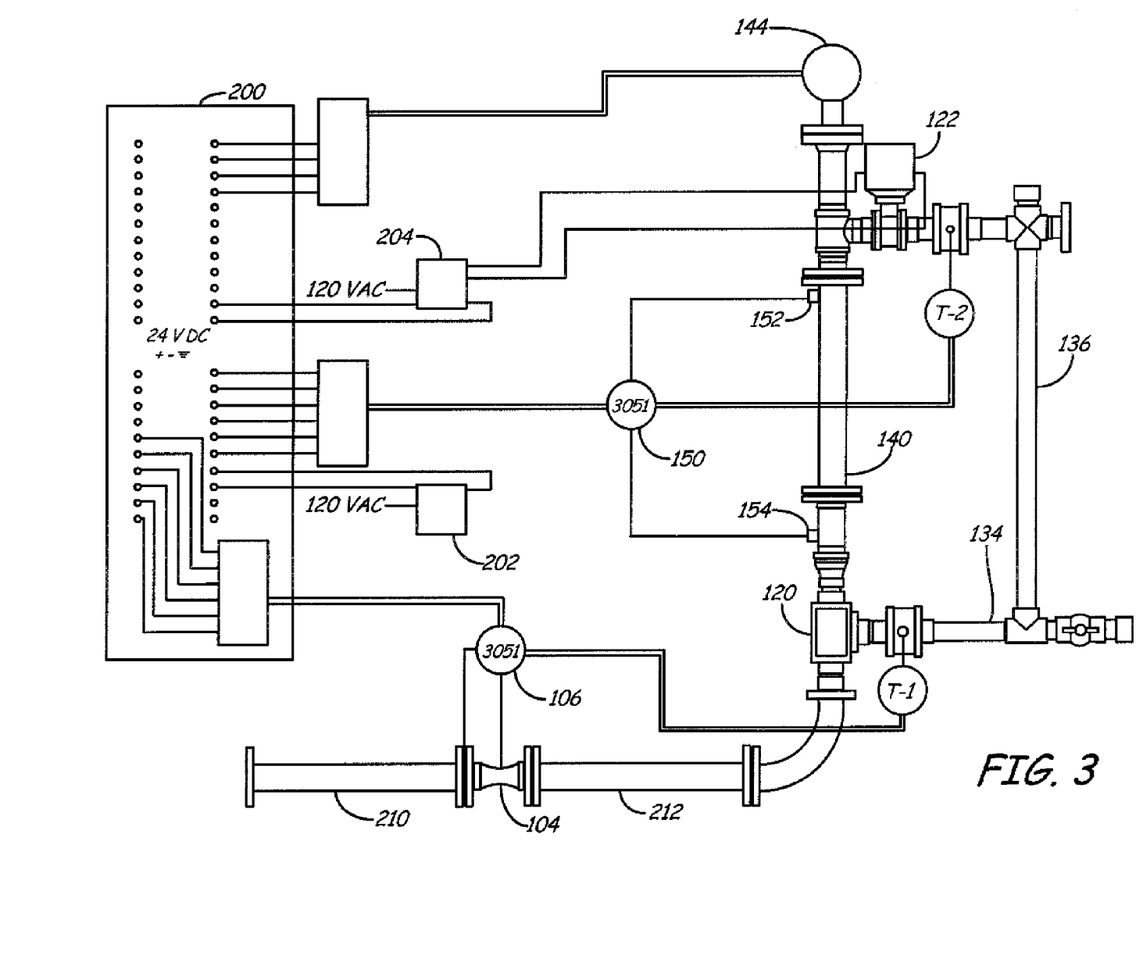
FIG. 3 is a diagrammatic view illustrating a flow measurement system coupled to a controller in accordance with an embodiment of the present invention.

FIG. 3 is a diagrammatic view illustrating system 100 coupled to controller 200 in accordance with an embodiment of the present invention. Controller 200 is preferably programmable logic controller, such as that available under the trade designation ControlWave MICRO Programmable Logic Controller (PLC) available from Emerson Process Management. Radar level transmitter 144, differential pressure transmitter 106, and 150 are coupled to controller 200. In addition, each of valves 120, 122 is coupled to a respective single pole double throw 120 VAC relays, 202, 204, respectively. Each of relay 202, 204, in turn is coupled to control outputs from controller 200. Accordingly, controller 200 is able to selectively direct flow through pipes 134, 136, or through column 140. Controller 200 is thus responsible for controlling the valves via its internal clock, or some other suitable event, and also responsible for recording the measurements from guided wave radar level transmitter 144 and the differential pressure multivariable transmitters 106, 150. Moreover, through its communication with differential pressure transmitters 106, 150, and radar level transmitter 144, controller 200 can determine volumetric fractions of components held within column 140, and can combine that knowledge with the flow rate provided by transmitter 106 to provide an estimate of volumetric flow rate of the various components flowing through the system.

FIG. 3 also illustrates an additional feature in that conditioning runs 210, 212 are provided both upstream and downstream from venturi 104. Preferably, each conditioning run has a length that is at least approximately twenty times its diameter.

Figure 4:
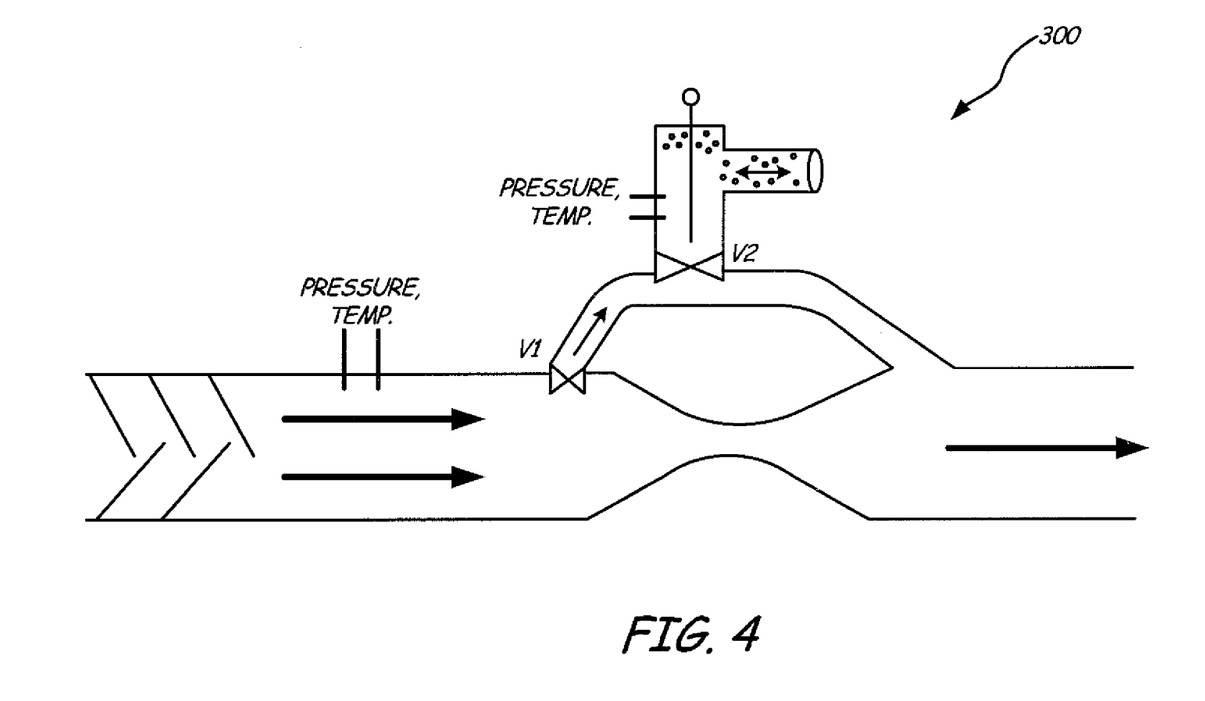
FIG. 4 is a diagrammatic view of a multiphase flowmeter using batch separation in accordance with another embodiment of the present invention.

FIG. 4 is a diagrammatic view of a multiphase flowmeter using batch separation in accordance with another embodiment of the present invention. Specifically, the embodiment illustrated in FIG. 4 differs from that illustrated in FIGS. 1-3 in that the entire flow of the process fluid is not directed through the separation path, instead, a volume of flow is essentially split from the primary flow and sequestered to subsequently allow it to settle. The embodiment would require additional equipment such as a pump or piston that would be required to remove the sample from the sampling chamber. The rest of the design remains quite similar.

The embodiment illustrated with respect to FIGS. 1-3 provides a number of advantages over traditional multiphase fluid flow measurement solutions. Specifically, the entire flow is captured in the sample chamber (column 140) which ensures that there will be no issues with capturing an unrepresentative sample. Moreover, the final readings are an accurate representation of what the pipe is carrying. As long as the dielectric properties of the various layers are arranged from low to high, top to bottom, the guided wave radar level transmitter can distinguish between the different phases independent of temperature, viscosity, color of fluid, impurities, et cetera. The features of the embodiments illustrated with respect to FIGS. 1-4 do not take continuous composition data, but instead create a running average of the composition of an oil well by accurately measuring the composition of multiple samples. For oil fields where the conditions may change rapidly, this batch measurement strategy will cause embodiments of the present invention to be less accurate than prior art-approaches that measure composition continuously. However, because the water cut of an oil well does not change drastically in a short time, the error caused by embodiments of the present invention should be well under ten percent. Also, other types of multiphase mass flowmeters sometimes have issues with different compositions, such as high water cut or high gas cut mixtures. Embodiments of the present invention have no such issues with any type of mixture and just as accurately measure any type of gas/oil/water compositions. Finally, embodiments of the present invention provide a very simple and affordable system. Many technological solutions are available for continuous composition measurement, but they are often extremely complex and/or expensive in order to move their error closer and closer to one percent. However, management of a declining oil well, such low error may not be warranted.

In recognition that one potential limitation of embodiments of the present invention is the lack of a real-time indication of multiphasic volumetric flow, embodiments of the present invention also include techniques for estimating equilibrium interphase level positions by extrapolations of first order kinetic weight expressions. Through these techniques, it was possible to speed up the response time of multiphase flowmeters in accordance with embodiments of the present invention. Moreover, it was possible to estimate the final equilibrium interphase level positions in guided wave radar chamber before the layers have completely phase separated.

Techniques listed below will document a calculation procedure wherein the raw interface level position data are regressed to a first order exponential function while the layers are still phase separating. Once the parameters of the exponential functions have been determined, the volume fractions of oil, water, and gas in the original mixture can be calculated without waiting for the complete phase separation to occur.

These calculation techniques are based upon a theory where the physics of oil/water and gas/oil separation lead to a prediction that, the unsteady state connects will follow a first order exponential. Equation 1 provides the proposed exponential function.

$$L_t = L_0 - \Delta L^*(1 - \exp[-t/k])$$ (Equation 1)

Where:

t=Elapsed Time Since Mixture Began Phase Separating;
k=$1^{st}$ Order Exponential Time Constant;
$L_t$=Interface Level at Elapsed Time, t;
$L_0$=Interface Level at Elapsed Time, t=0;
$L_\infty$=Final Equilibrium Interface Level at Elapsed Time, t=∞;
ΔL=Total Change in Interface Level at Elapsed Time, t=∞→ΔL=$L_\infty$−$L_0$.

Figure 5:
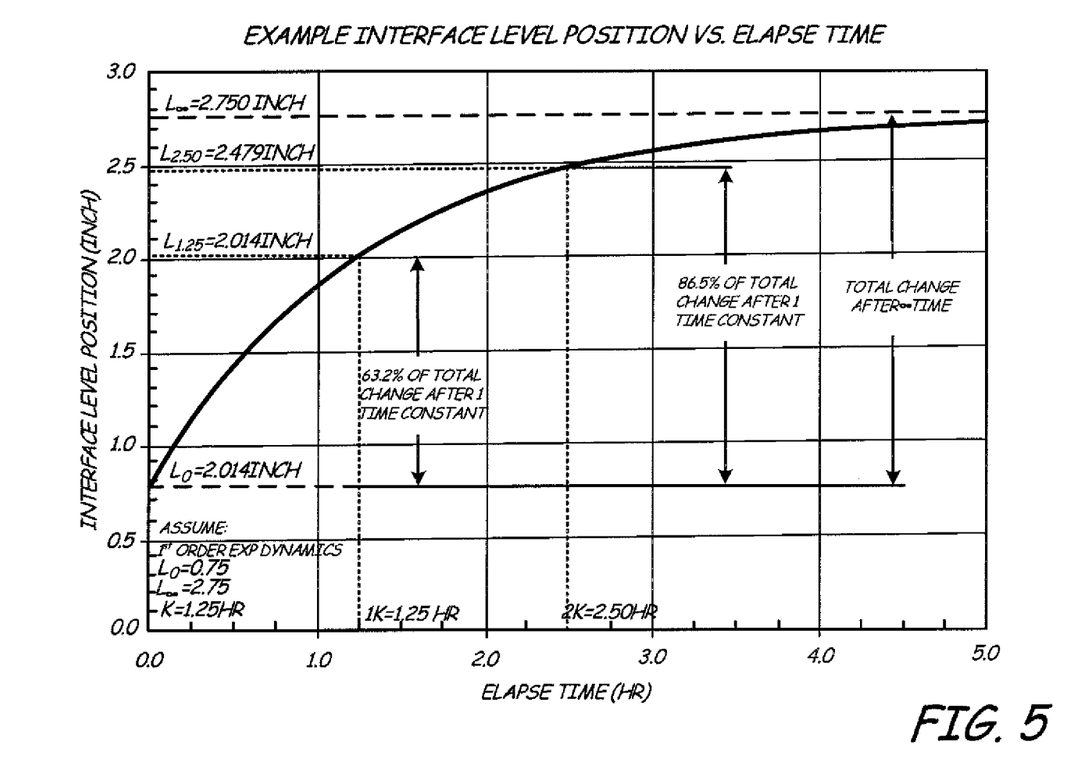
FIG. 5 is a graph illustrating a first order exponential function useful for estimating separation heights in accordance with an embodiment of the present invention.

In order to calculate the volume fractions of oil, water and gas in the mixture, the final position for the levels of the oil/water interface and the gas/oil interface are required. The guided wave radar level transmitter 144 continuously measures both interface positions as the mixture phase separates. Preferably, the programmable logic controller 200 logs the interface level data long with a time stamp so the elapsed time is known. However, in practice, neither the time constants nor the final interface level are known. FIG. 5 illustrates an example of what Equation (1) looks like for the following valves of the parameters:

k=1.25 hr;
$L_0$=0.75 inch; and
$L_\infty$=2.75 inch.

FIG. 5 illustrates that after one time constant has elapsed, the interface level has changed 63.2% of the total change that would occur if an infinite amount of time were allowed to elapse. Similarly after two time constants time elapsed, the interface level has changed 86.5% of the total change. The interface level approaches its final value asymptotically as time goes to infinity. Expressed in terms of elapsed time constant, the interface level approaches its final value as shown in Table 1.

TABLE 1

| $1^{st}$ Order Exponential Dynamics | |
|---|---|
| [t/k] | % of Total Change |
| 0 | 0 |
| 1 | 63.2 |
| 2 | 86.5 |
| 3 | 95.0 |
| 4 | 98.2 |
| 5 | 99.3 |
| 6 | 99.8 |
| 10 | 99.995 |

As can be seen, after five time constants have elapsed, the interface level is at 99.3 of the final value and further changes occur slowly after that.

In order to speed up the analysis, it is desirable to make a good estimate of the final interface level positions as soon as possible after the mixture begins phase separating. By regressing the data to a first order exponential kinetic model and assuming the model is a good fit to the data, the final interface levels can be predicted without waiting for the mixture to completely phase separate. These final interface level positions are then used to calculate volume fractions for the oil, water, and gas fractions in the original mixture.

Usually, the three-phase mixture is separated into its oil, water, and gas fractions fairly close to the well head. This phase separation is done in a piece of process equipment called a separator. Since the time constants determined by this technique are actually the kinetic rate constants of the phase separation, measuring these time constants provides additional information for the operation of the oil field. Specifically, these time constants can be used to estimate the maximum separator throughput that is possible with the currently produced fluid coming from the well. A change in these time constants also signals to the operator that something about the fluid coming from underground reservoir has changed, possibly requiring corrective action to properly manage the resource.

In FIG. 5, note how the slope of the curve is steepest at the start, t=0. As elapse time increases, the slope of the curve decreases, gradually approaching zero slope (i.e. horizontal) as time approaches infinity. By definition, the first derivative of a function gives the slope of the function. The first derivative of equation 1 is given by:

$$dL_t/dt = (L_\infty/k)*\exp[-t/k] - (L_0/k)*\exp[-t/k] \quad \text{(Equation 2)}$$

At t=0, exp[−t/k]=1. Therefore, the slope at t=0 is given by:

$$[Slope]_0 = [dL_t/dt]_0 = (L_\infty - L_0)/k \quad \text{(Equation 3)}$$

The instrument can estimate the slope of the curve at any point by subtracting two consecutive interface level measurements and then dividing by the elapsed time between those two measurements. Assuming the slope at time t=0 has been measured by this method, the instrument may measure the slope at some later time t. Making the change of variable, [n*k]=t in equation 2 where n is the number of elapsed time constants, allows Equation 2 to be divided by Equation 3 as follows:

$$[Slope\ Ratio] = ((L_\infty/k)*\exp[-n*k/k] - (L_0/k)*\exp[-n*k/k])*k/(L_\infty - L_0) \quad \text{(Equation 4)}$$

Where:

[Slope Ratio]=[Measured Slope at Time,t]/[Measured Slop at Time,t=0]

Simplifying and solving Equation 4 for n:

$$n = -\ln [Slope\ Ratio] \quad \text{(Equation 5)}$$

It is apparent that some experiments are required to determine how much data must be collected in order to get an accurate estimate of k. Certainly, the longer that data is collected, the more accurate the estimate will be. As a starting point, it is expected that n=>1 (i.e. collect data for at least one time constant). If n<1, then generally more data will be required.

Since the elapsed time t, at the second measurement is known, k is given by:

$$k = -t/\ln [Slope\ Ratio] \quad \text{(Equation 6)}$$

Solving Equation 3 for $L_\infty$ and then substituting Equation 6 for k provides:

$$L_\infty = k*[dL_t/dt]_0 + L_0 = -t*[dL_t/dt]_0/\ln [Slope\ Ratio] + L_0 \quad \text{(Equation 7)}$$

Figure 6:
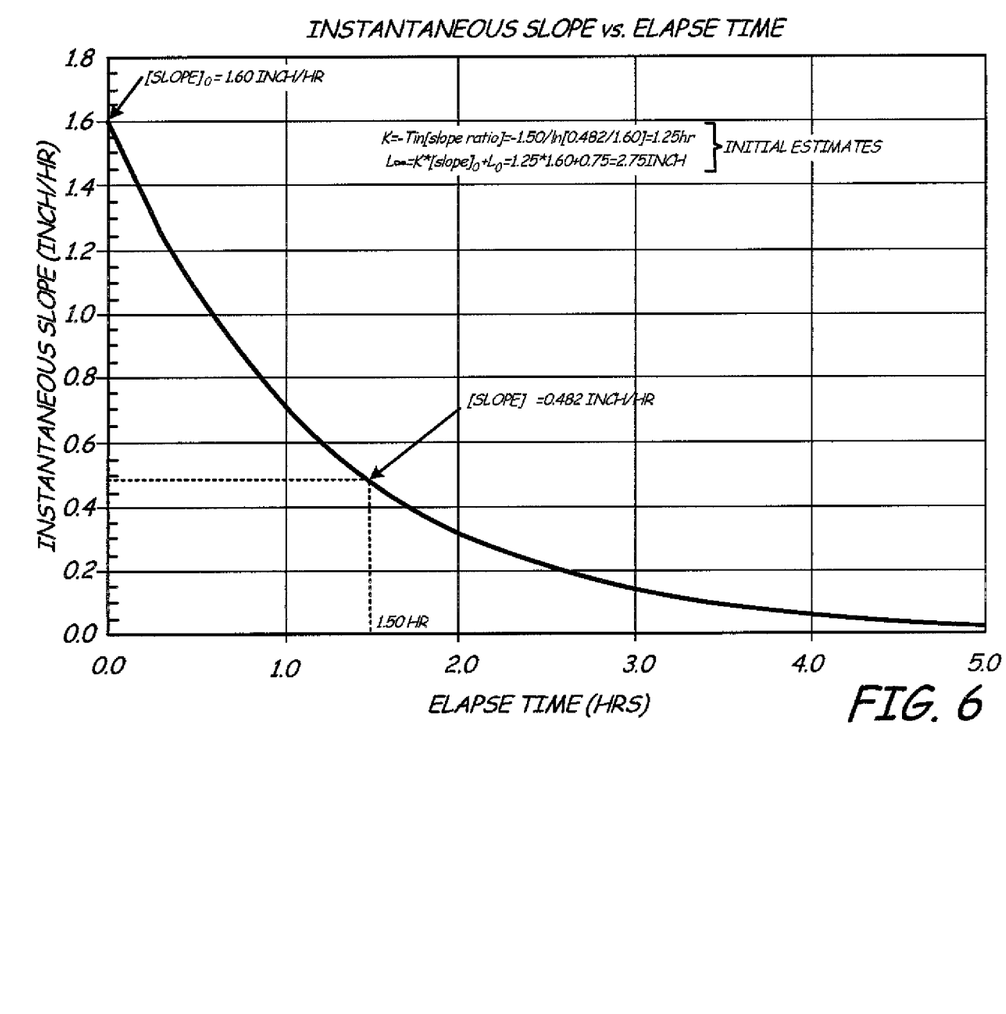
FIG. 6 illustrates is a graph of instantaneous slope versus elapsed time for the same dataset shown in FIG. 5.

FIG. 6 illustrates Equation 2 plotted for the same data set as shown in FIG. 5. The values of k and $L_\infty$ are estimated using an arbitrary value of t=1.5 hours for calculation. Equations 6 and 7 give estimates for kinetic parameters required by the model. However, the guided wave radar level transmitter is likely to have some noise associated with it. Calculating a derivative from this noisy signal will tend to magnify the noise. Therefore, it is better to regard Equations 6 and 7 as providing good initial estimates for an iterative calculation which will use many data points to "average" out the noise to improve accuracy.

Using the measured value of $L_0$ and estimated value of $L_\infty$ from Equation 7, the following change of variable to the raw guided wave radar level transmitter data point ($L_t$) are:

$$Y = \ln [(L_\infty - L_t)/(L_\infty - L_0)]$$

Where:

Y=Dimensionless Interface Level Parameter.

Figure 7:
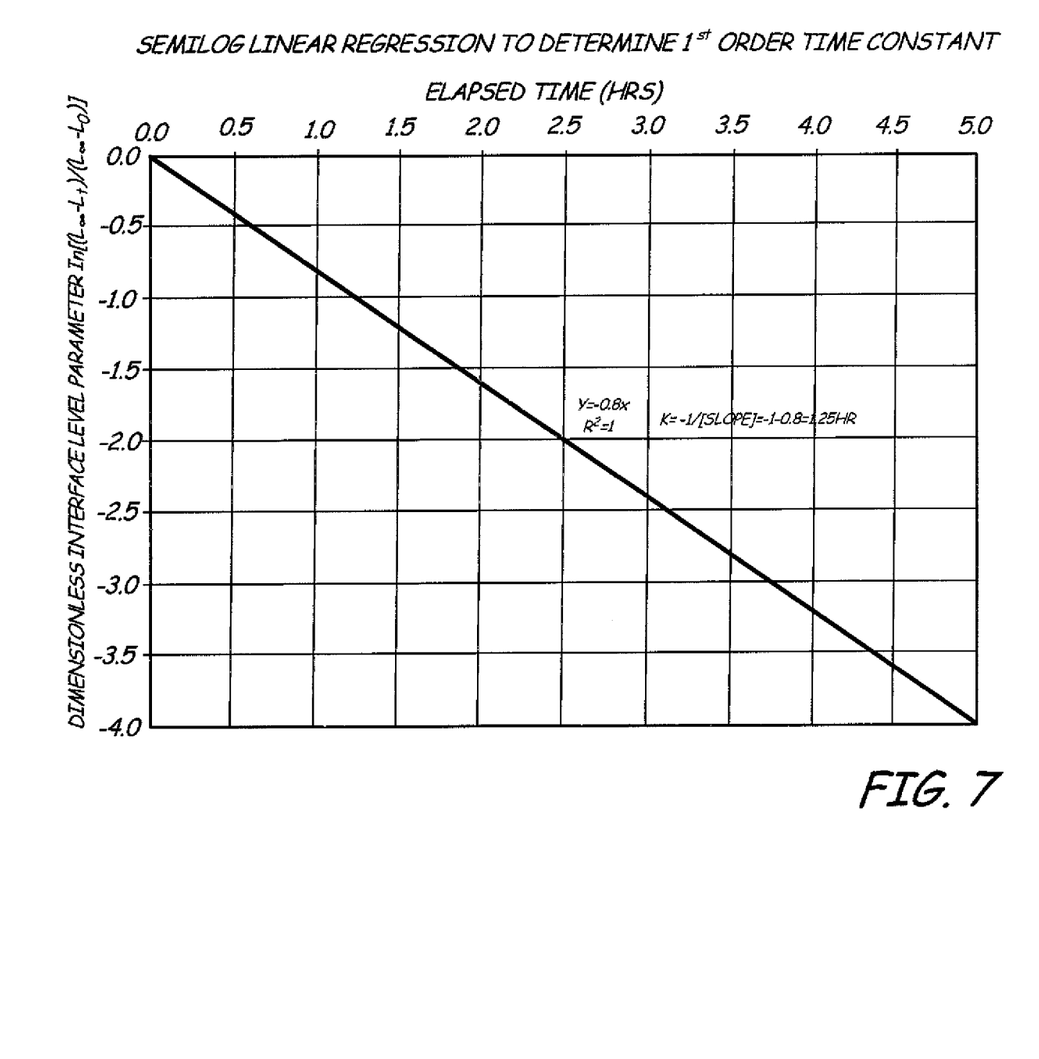
FIG. 7 illustrates a straight line relationship for semi log linear regression to determine a first order time constant in accordance with an embodiment of the present invention.

When this Y variable is plotted versus elapsed time, t, the result is a straight line. FIG. 7 illustrates this straight line relationship for the same example data as provided in FIG. 5. This straight line can be regressed from the data points using standard statistical techniques. Note that the Y intercept is theoretically zero in FIG. 7 because of the change of variable. If the Y intercept does not regress to a value near 0, then something is wrong. The time constant, k, is given by −1/[Slope] of the regressed straight line in FIG. 7. This new estimate of k along with the measured values of $L_0$ and $[dL_t/dt]_0$ in Equation 7 are used to calculate a new estimate of $L_\infty$. Substituting these new values into Equation 8 and regressing a new straight line provides a new estimate of k. Comparing the previous value of k with the new value is performed and iterated until the value is stabilizes. This direct substitution procedure should converge on a stable value of k in only one or two iterations and the $R^2$, "regression fit parameter" on the straight line regression should be very close to a value of 1.

Assuming X is the elapsed time, Y is previously defined dimensionless interface level parameter, and N is the number of measurements; the straight line is regressed by the use of the following equations:

$$S_{XX} = N*\Sigma X^2 - [\Sigma X]^2 \quad \text{(Equation 9)}$$

$$S_{YY} = N*\Sigma Y^2 - [\Sigma Y]^2 \quad \text{(Equation 10)}$$

$$S_{XY} = N*\Sigma(X*Y) - (\Sigma X*\Sigma Y) \quad \text{(Equation 11)}$$

$$R^2 = (S_{XY})^2/(S_{XX}*S_{YY}) \quad \text{(Equation 12)}$$

$$[Slope] = S_{XY}/S_{XX} \quad \text{(Equation 13)}$$

$$[Intercept] = (\Sigma X^2*\Sigma Y) - (\Sigma X*\Sigma(X*Y))]/S_{XX} \quad \text{(Equation 14)}$$

Embodiments of the present invention provide a low-cost simple multiphase fluid flow measurement device that is able to provide useful information relative to an oil well by periodically separating flow from the oil well and allowing it to gravitationally separate. Further, since the separation requires some time, embodiments of the present invention also generally estimate the final separation level based upon a first order relationship. Thus, waiting until the final separation has occurred is not required for embodiments of the present invention to provide useful information.

While embodiments of the present invention have been described with respect to three distinct process fluid components (gas/water/oil), embodiments of the present invention are useful for any application where multiple immiscible fluid components are provided in a composite flow and the flow components will separate gravitationally over time, as long as the components have differing dielectric constants, and preferably, dielectric constants that are arranged in an order such that the fluid that settles on top has the lowest dielectric constant and the fluid that settles on the bottom has the highest dielectric constant.

Although the present invention has been described with reference to preferred embodiments, workers skilled in the art will recognize that changes may be made in form and detail without departing from the spirit and scope of the invention.

What is claimed is:

1. A process fluid flow system comprising:
an input, an output, and a plurality of fluid circuits disposed between the input and output;
at least one valve disposed to selectably cause process fluid to flow through either a first circuit of the plurality of circuits, or a second circuit of the plurality of circuits, wherein process fluid flows through the first circuit during normal production, and through the second circuit during process fluid sequestration;
a process fluid flow measurement device operably interposed between the input and output and configured to measure total flow through the system;
a separator disposed in the second circuit, the separator being arranged to allow the process fluid to separate gravitationally over time into immiscible components of the process fluid, the separator having a known internal volume;
a level measurement device disposed to measure heights of interfaces within the separator; and
a controller coupled to the at least one valve, the process fluid flow measurement system, and the level measurement device, the controller being configured to combine total process fluid flow information from the process fluid flow measurement device with measured height information from the level measurement device to provide fractional flow rates for at least one immiscible component of the process fluid.

2. The system of claim 1, wherein the at least one valve includes a plurality of valves cooperating to selectably provide the entire process fluid flow through either the first or the second fluid circuits.

3. The system of claim 1, wherein the controller controls operation of the at least one valve to periodically cause process fluid to flow through either the first or the second fluid circuits.

4. The system of claim 1, wherein the process fluid flow device includes a differential pressure transmitter operably coupled to a venturi through which process fluid flows.

5. The system of claim 4, and further comprising a process fluid temperature sensor disposed to measure temperature of process fluid and provide an indication thereof to the differential pressure transmitter.

6. The system of claim 1, and further comprising a differential pressure transmitter coupled to a pair of pressure taps on the separator.

7. The system of claim 1, wherein the at least one valve is a ball valve.

8. The system of claim 1, wherein the controller is configured to estimate final separation heights based upon an interface height measurement before the immiscible components of the process fluid have finally separated.

9. The system of claim 8, wherein the estimate is based on a first order exponential function.

10. The system of claim 9, wherein at least one parameter of the exponential function is determined empirically.

11. The system of claim 10, wherein the at least one parameter of the exponential function includes the first order exponential time constant.

12. The system of claim 11, wherein changes in the first order exponential time constant are provided as a diagnostic of the process fluid flow.

13. The system of claim 1, wherein the level measurement device is a guided wave radar level measurement transmitter.

* * * * *